Patented Nov. 28, 1950

2,532,223

UNITED STATES PATENT OFFICE 2,532,223

VINYL RESIN DISPERSION

William H. Bromley, Jr., Agawam, Mass., assignor to Shawinigan Resins Corporation, Springfield, Mass., a corporation of Massachusetts No Drawing. Application December 4, 1948, Serial No. 63,630

8 Claims. (Cl. 260—23)

This invention relates to aqueous dispersions of polyvinyl butyral resins and the process for preparing the same.

The preparation of aqueous dispersions of polyvinyl butyral resins has been subject to many difficulties. One difficulty with certain processes has been the necessity for heavy duty equipment and high power consumption in order to carry on properly, the mixing operations. This has increased the cost of such dispersions and, consequently, reduced their field of application to a considerable extent. Also the size of the resin particles in dispersions prepared according to certain processes has been found to be too large for some purposes.

It is an object of this invention to provide a new process for preparing aqueous dispersions of polyvinyl butyral resins. A particular object is to provide a process for preparing polyvinyl butyral resin dispersions with greatly reduced mixing energy requirements. A further object is to provide a process for preparing polyvinyl butyral resin dispersions in which the resin particles are exceedingly small in size.

These and other objects are attained according to this invention by admixing a polyvinyl butyral resin, a plasticizer and a soap-type emulsifying agent in the presence of an amount of water which is slightly in excess of the minimum amount required for a resin-in-water dispersion, agitating the resulting mixture while allowing sufficient water to evaporate to cause the dispersion to invert to a water-in-resin dispersion, continuing the mixing operation until the resin is completely plasticized and colloided and then adding a sufficient amount of water to cause the dispersion to revert to a resin-in-water dispersion.

It is found that by conducting the preparation of polyvinyl butyral resin dispersions in the manner described above, the mixing operation may be accomplished in light-weight equipment and with a relative low power consumption to produce a stable dispersion in which the resin particles are exceedingly fine.

The following examples are illustrative of the present invention but are not to be construed as limitative thereof. Where parts are given, they are parts by weight.

The polyvinyl butyral used in the examples is made up on a weight basis of 16–22% hydroxyl groups calculated as polyvinyl alcohol, less than 3% acetate groups calculated as polyvinyl acetate and the balance substantially butyraldehyde acetal. It is made from a polyvinyl acetate having a viscosity of 40–60 centipoises at 20° C. in a one-molar benzene solution by hydrolysis and subsequent reaction with butyraldehyde.

Example I

A solution of 43 parts of sodium hydroxide and 1520 parts of water is added to 7200 parts of finely divided polyvinyl butyral in a standard Werner-Pfleiderer mixer equipped with sigma blades. The mixture is heated and agitated at 80° C. for about 10 minutes. Thereafter a solution of 320 parts of oleic acid in 2880 parts of butyl ricinoleate is slowly added thereto. The temperature is lowered to about 60° C. during the addition of the oleic acid-butyl ricinoleate mixture. As a result of this treatment, a resin-in-water type dispersion is obtained. The stirring is continued at 60° C. while allowing water to evaporate from the surface of the mix. After about 20 minutes under these conditions, it is found that sufficient water has evaporated so that the dispersion has reverted to a water-in-resin dispersion. Agitation is continued for at least 10 minutes to complete the plasticization and colloiding of the resin and to improve the dispersion of the internal phase. The temperature is maintained at 60° C. or lower during this stage so as to insure particles of small size. Thereafter water is slowly added to the dispersion so as to cause the dispersion to revert to a resin-in-water dispersion. The resulting product is a thick, pasty dispersion which may be diluted with water to the desired solids content, for example, 50% solids.

Examination of the product shows that the resinous particles therein are extremely fine in size and films made therefrom are clear and transparent. Furthermore, the dispersion of this example after dilution to a solids content of 50% is found to have a viscosity of 1200–1300 cp. at 25° C. which is at least 400% higher than that of a dispersion made by adding the basic portion of the emulsifying agent at a later stage in the process.

The dispersion prepared as described above is found to be exceedingly useful for many purposes, in particular, in the formation of films and for impregnating and coating fibrous materials.

In addition to other advantageous characteristics, the dispersions of the invention, as illustrated by the dispersion of Example I, are found to be extremely stable in that the resin does not settle out after long standing and it may be diluted to any desired extent to meet the requirements of any particular use. The dispersions of the invention are also found to yield exceptionally clear films having surprisingly high ultimate elongation values.

In contrast to prior processes in which a water-in-resin dispersion is initially formed and the basic portion of the emulsifying agent is added part way through the process, the process of the invention requires far less rugged equipment. Thus, such prior processes require equipment of the type used for compounding rubber, such as rubber rolls, Banbury mixers or Werner-Pfleiderer dispersion mixers.

The polyvinyl butyral dispersions which find the widest application contain 20-40% plasticizer on a solids basis. Such formulations are generally tough and tenacious and usually require 1.8-2.5 horsepower for every gallon of working capacity. In contrast thereto, the present process requires only about 1 horsepower or less for every gallon of working capacity.

Another requirement of prior processes has been the necessity for equipment of a type which can exert pressure on the mixing mass during the portion of the process prior to the final inversion. However, by operating according to the present process, it is not necessary that heavy mechanical rams or pressure heads be employed.

Another advantage of the present invention resides in the fact that the basic portion of the emulsifying agent may be added initially, thus eliminating the difficult operation of subsequently incorporating the basic material in the viscous plasticized resin. The latter type of process makes it very difficult to provide a homogeneous mixture and if the mix is not evenly dispersed, relatively large amounts of uninverted dispersion are liable to be present in the final product.

Numerous variations may be introduced into the process of the invention, as illustrated by the examples. In place of butyl ricinoleate, other plasticizers may be used, examples of which are well known to those skilled in the art, e. g., castor oil, dibutoxy ethyl phthalate, diethyl phthalate, dibutyl-sebacate, dibutyl phthalate, triethylene glycol dihexoate, triethyl glycol ester of coconut oil fatty acids, etc. Mixtures of these and/or other plasticizers may also be employed.

The amount of plasticizer incorporated into the resin depends upon the properties desired in the final product. Usually 5-80 parts of plasticizer are used for every 100 parts of resin and as pointed out above, for many of the present applications of the dispersions of the invention 20-40 parts of plasticizer represents a desirable amount.

In place of sodium oleate, other emulsifying agents made from strong bases and soap-forming organic acids may be used. These include, for example, salts of such bases as the alkali metals, e. g., sodium, potassium, lithium, cesium and rubidium; quaternary ammonium bases, e. g., triphenyl methyl ammonium hydroxide, tetraethyl ammonium hydroxide, etc.; triethanolamine, morpholine, etc., made with such organic acids as stearic acid, oleic acid, ricinoleic acid, palmitic acid, lauric acid, dodecyl benzene sulfonic acid, abietic acid, etc. According to a preferred embodiment, the acid portion is an organic acid having an aliphatic chain of at least 10 carbon atoms, e. g., 10-20 carbon atoms, such as those given above.

The amount of emulsifying agent may be substantially varied but usually at least 0.5 part for every 100 parts of butyral is required in order to effect proper inversion during the process. The preferred minimum amount depends at least in part on the nature of the emulsifying agent. Thus, in the case of sodium oleate, it is preferred to use at least one part by weight for every 100 parts by weight of acetal resin while in the case of ammonium oleate, at least 8 parts and in the case of morpholine oleate, at least 14 parts are preferred.

On the other hand, the upper limit of the quantity of emulsifying agent does not appear to be critical. Thus, up to 25-30 or more parts by weight of emulsifying agent may be used for every 100 parts by weight of acetal resin. In general, the upper limit is determined by the properties desired in the final product and the effect of the emulsifying agent on these properties. Instead of forming the emulsifying agents in situ as is done in Example I, it may be separately prepared and incorporated in the water in place of the sodium hydroxide. However, it is found to be advantageous to incorporate the basic portion of the emulsifying agent with the initial water and subsequently incorporate the acid portion of the emulsifying agent with the plasticizer.

Another variation which may be introduced in the process of the invention is to admix the polyvinyl butyral with the plasticizer and the oleic acid without effecting colloiding thereof and thereafter incorporate therewith the sodium hydroxide solution. This procedure has the advantage of permitting considerable plasticization of the resin prior to any soap formation and reduces the tendency of soap layers to form on the surface of the resin particles, thereby rendering plasticization more difficult.

The relative proportion of water and plasticized resin which is required for the final inversion to a resin-in-water type of dispersion is dependent upon several operating conditions. For example, increasing the temperature of the mix, the amount of plasticizer and/or the amount of emulsifying agent tends to decrease the amount of water required to effect the final inversion. While not entirely necessary, it is found that the processing time is reduced when the final inversion occurs at a solids content of 80-90% and accordingly, reaction conditions are correlated with this in mind. The most satisfactory means for regulating the inversion point is to adjust the temperature of the mass and accordingly this factor is usually correlated with the other factors to cause inversion to take place when the water content is between 10 and 20%. In the case of the process of Example I, inversion takes place at 53° C. when the water content is 17%.

The amount of water initially introduced is sufficient to cause a resin-in-water dispersion to form. For purposes of economy in processing, it is usually preferred not to exceed the minimum amount required by more than 5-10%, i. e., on evaporation of about 5-10% of the water, the dispersion reverts to a water-in-resin dispersion.

The polyvinyl butyrals which are used in accordance with the invention may vary substantially in their composition. Thus, polyvinyl butyrals may be used which have up to 30% hydroxyl groups by weight, calculated as polyvinyl alcohol, up to 30% ester groups by weight, calculated as polyvinyl ester and the balance substantially butyraldehyde acetal. Among the preferred embodiments are polyvinyl butyrals containing more than 5% and usually more than 10% hydroxyl groups by weight, but not more than 25% hydroxyl groups, calculated as polyvinyl alcohol.

According to a further embodiment of the invention, the polyvinyl butyral contains 10-20% hydroxyl groups by weight, calculated as polyvinyl alcohol, less than 3% acetate groups by weight, calculated as polyvinyl acetate, and the balance substantially butyraldehyde acetal.

The polyvinyl esters from which the polyvinyl butyrals are made may have widely varying degrees of polymerization as evidenced by the viscosities of solutions thereof. For example, polyvinyl acetates may be used which in 1-molar benzene solutions have viscosities of 5-500 or more centipoises at 20° C. Other polyvinyl esters may vary correspondingly.

The ester groups in the polyvinyl butyrals are usually acetate groups but the acetate groups may be wholly or partially replaced by other ester groups such as formate, propionate, butyrate, benzoate, etc.

The temperatures used in preparing the dispersions of the invention which may vary substantially, as indicated above, are dependent upon such conditions as solids content, amount and type of emulsifying agent, amount and type of plasticizer, etc. Usually, it is found that it is most feasible to operate within a temperature range of 40-100° C.

When it is desired to increase the amount of plasticizer in a dispersion prepared in accordance with the invention, this may readily be done by forming an aqueous dispersion of the plasticizer to be added and then incorporating the dispersion in the polyvinyl butyral dispersion. In the case of the dispersion of Example I, 40 parts of plasticizer are incorporated for every 100 parts of polyvinyl butyral. The amount of plasticizer may be raised to 90 parts by forming an emulsion of 20 parts of butyl ricinoleate, 30 parts of dibutoxy ethyl phthalate and 28 parts of oleic acid in a solution of 0.4 part of sodium hydroxide in 48.2 parts of water and adding a sufficient amount to raise the plasticizer content to 90 parts. This may be done conveniently by passing the mixture through an Eppenbach mill and then incorporating the dispersion in the polyvinyl butyral dispersion. It is found that the stability of the product is excellent and films which are soft and tacky may be made therefrom.

The foregoing description is given in illustration and not in limitation of the invention as set forth in the appended claims.

What is claimed is:

1. A process for preparing a stable aqueous dispersion of polyvinyl butyral resin which comprises agitating a mixture of 0.5 to 30 parts of an organic acid capable of forming a soap, 5 to 80 parts of a plasticizer for polyvinyl butyral, 100 parts of a polyvinyl butyral containing not over 30% hydroxyl groups calculated as polyvinyl alcohol, not over 30% ester groups calculated as polyvinyl ester and the balance substantially butyral acetal, and an amount of an aqueous solution of a strong base to substantially neutralize the organic acid, the amount of water being such as to cause a resin-in-water dispersion to be formed, agitating the dispersion while evaporating sufficient water to cause the dispersion to invert to a water-in-resin dispersion, continuing the agitation until the resin is plasticized and then adding a sufficient amount of water with agitation to cause the dispersion to revert to a resin-in-water dispersion.

2. A process as defined in claim 1 in which the polyvinyl butyral is initially mixed with the aqueous solution of the strong base and thereafter a mixture of the organic acid and the plasticizer is incorporated therewith.

3. A process as defined in claim 2 in which the organic acid is oleic acid and the strong base is sodium hydroxide.

4. A process as defined in claim 1 in which a mixture of the organic acid, the plasticizer and the polyvinyl butyral is added to the aqueous solution of the strong base.

5. A process as defined in claim 4 in which the organic acid is oleic acid and the strong base is sodium hydroxide.

6. A process as defined in claim 1 in which the ester groups are acetate groups.

7. A process as defined in claim 1 in which the polyvinyl butyral contains, on a weight basis, 5-25% hydroxyl groups and less than 3% acetate groups.

8. A process as defined in claim 1 in which the organic acid is oleic acid and the strong base is sodium hydroxide.

WILLIAM H. BROMLEY, Jr.

REFERENCES CITED

The following references are of record in the file of this patent:

UNITED STATES PATENTS

| Number | Name | Date |
|---|---|---|
| 2,396,609 | Rogers | Mar. 12, 1946 |
| 2,431,800 | Geiges | Dec. 2, 1947 |